Sept. 26, 1961     E. W. CARPENTER ET AL     3,001,509
ADJUSTABLE MASKING DEVICE
Filed May 11, 1959
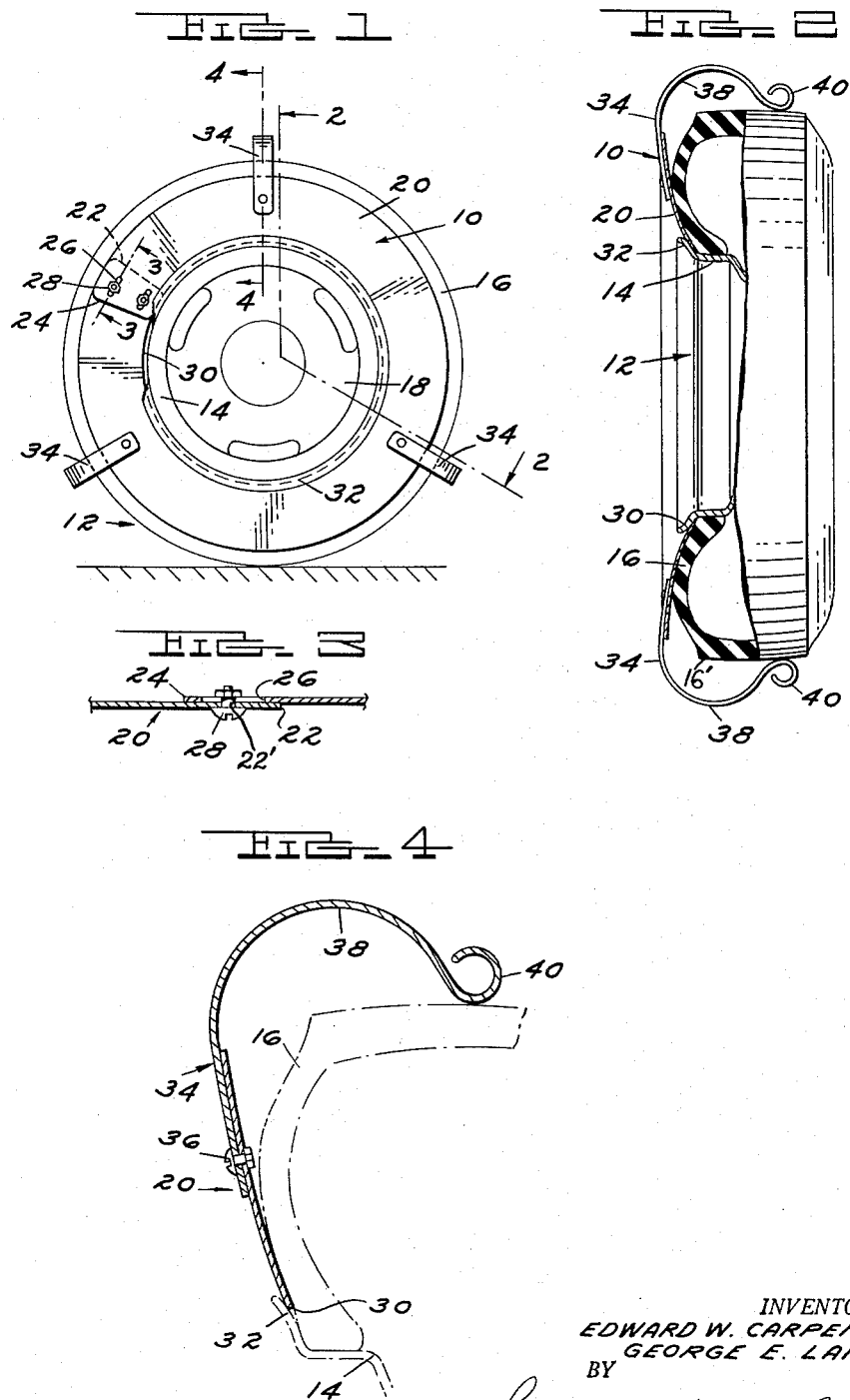
INVENTORS
EDWARD W. CARPENTER
GEORGE E. LANE
BY
*Whittemore, Hulbert & Belknap*
ATTORNEYS

3,001,509
ADJUSTABLE MASKING DEVICE
Edward W. Carpenter, 35318 Main St., and George E. Lane, 34811 Ash St., both of Wayne, Mich.
Filed May 11, 1959, Ser. No. 812,264
4 Claims. (Cl. 118—503)

This invention relates generally to masking devices and refers more particularly to an adjustable masking device for vehicle wheels and the like.

The painting of vehicle wheel parts before assembly can usually be accomplished without masking problems. However, once the separate parts are assembled, considerable care must be taken to cover and thereby protect certain parts with a masking device, while other parts of the assembly are painted or coated. One such example is the protectioin of the tire of a vehicle wheel while the central body portion and rim thereof is spray painted.

Heretofore it has been difficult to attach masking devices to the vehicle wheels. As examples of prior masking devices, heavy kraft paper and masking tape were generally used for such masking purposes. Otherwise the tire was coated with cosmoline or other heavy grease which could later be wiped off. Quite obviously this is not a satisfactory masking arrangement.

Heretofore composite masking devices have been employed for protecting various parts of a vehicle wheel but insofar as we are aware, no provision has been made for applying to a vehicle wheel a masking device that is capable of being quickly and easily applied to and removed from the vehicle wheel to protect the tire thereof from paint applied to one or more other parts of the wheel.

It is an object of this invention to provide an annular masking device that may be quickly attached to and removed from a vehicle wheel.

It is also an object of this invention to provide a masking device that is adjustable to vehicle wheels of different sizes.

It is also an object of thhs invention to provide an annular masking device of concavo-convex configuration capable of better surface engagement with the tire of the vehicle wheel to protect such tire from paint applied to one or more other portions of the vehicle wheel.

Another object of this invention is to provide a masking device including means at the outer periphery thereof for properly positioning the masking device upon the tire of the vehicle wheel and for holding the annulus in proper masking position while paint is being applied to one or more other portions of the vehicle wheel.

These and other objects and advantages in the practice of this invention will be more apparent upon a reading of the following specification in regard to a working embodiment of this invention shown by the accompanying drawing.

In the drawing:

FIGURE 1 is an elevational view of our masking device applied to a vehicle wheel, with a portion of the rim of the wheel broken away.

FIGURE 2 is an enlarged cross-sectional view through the vehicle wheel and masking device illustrated in FIGURE 1, with a portion of the tire in elevation, and has been taken on the line 2—2 of FIGURE 1.

FIGURE 3 is an enlarged cross-sectional view through the adjustable end portions of the split annulus of our masking device, and has been taken on the line 3—3 of FIGURE 1.

FIGURE 4 is an enlarged sectional view through our masking device, with a portion of the tire shown by dot-dash lines, and has been taken on the line 4—4 of FIGURE 1.

Referring to the drawing in further detail:

The masking device 10 is applied to a vehicle wheel 12 which includes a dished body 14 of the disc type and a tire 16. The dished body 14 includes a hub receiving central portion 18 and a tire retaining rim 32.

In the present instance, the dished body 14 and tire retaining rim 32 are to be painted, and the tire 16 is to be protected from paint splatter.

The masking device 10 includes a thin transversely split contractible annulus 20 having overlapping end portions 22 and 24. The end portion 22 is provided with a pair of transversely spaced circular holes 22', while the end portion 24 is provided with longitudinally extending transversely spaced substantially parallel elongated slots 26 in registration with said holes 22'. Headed fasteners such as screws or bolts 28 extend through the circular holes 22' and engage the elongated slots 26. This arrangement enables the overlapping ends 22 and 24 to be adjustably connected together in various adjusted positions relative to each other. Thus the inner diameter of the annulus 20 may be varied as desired to fit tires 16 of different inside diameters.

Preferably the annulus 20 is formed from a relatively thin material, and is concavo-convex in configuration. Thus the inner peripheral edge 30 of the annulus 20 is more readily adapted to fit between the wheel rim 32 and one side of the tire 16, as shown in FIGURES 2 and 4, to position the annulus 20 in proper masking position to protect the tire 16 from paint applied to the dished body 14 and rim 32 of the vehicle wheel.

The concavo-convex configuration and adjustable feature of the annulus 20 enable the inner peripheral edge 30 of the annulus to fit snugly between the wheel rim 32 and the adjacent side of the tire 16.

The annulus 20 is detachably held in proper masking position upon one side of the vehicle wheel 12 by means of three spring arms 34 that are secured to and project radially outwardly from the concave surface of the annulus.

Preferably the arms 34 are elongated leaf springs and are secured at their inner ends by bolt, rivet or other fasteners 36 to the annulus 20 at circumferentially spaced points thereof. Each arm 34 has a substantially C-shaped intermediate portion 38 to straddle the adjacent edge of the tire 16, and has a free end 40 that is adapted to have frictional gripping engagement with the tread 16' of the tire 16. Such free end 40 may be outwardly curled or return bent, as shown in FIGURES 2 and 4, to facilitate engagement with the tire 16.

The resilient spring arms 34 effectively hold the annulus 20 in proper masking position relative to the tire 16, without the use of separate fastener means. They also serve to help center the annulus 20 when it is assembled with the wheel 12.

In practice, the fasteners 28 are employed to hold the overlapping end portions 22 and 24 of the annulus 20 in the desired adjusted relation with each other, depending upon the diameter of the wheel rim 32 to be engaged. However, such fasteners 28 are loose when the annulus 20 is applied to the vehicle wheel 12. Thus, the masking device 10 may be quickly applied and attached to the vehicle wheel 12 by simply moving it bodily toward one side of such wheel, so that the spring arms 34 will frictionally engage the tread 16' of the tire 16 of the wheel. Then the annulus 20 is manually contracted so that the inner peripheral edge 30 thereof will fit between the wheel rim 32 and the adjacent side of the tire 16, whereupon the fasteners 36 are tightened to hold the annulus in such contracted position. This assures snug engagement of the inner peripheral edge 30 of the annulus 20 with the wheel rim 32 to protect the tire 16 from paint applied to the adjacent surfaces of the dished body 14 and rim 32 of the vehicle wheel.

The reverse procedure enables the masking device 10 to be quickly removed and readied for another job.

It will be appreciated that in certain instances the inner peripheral size of the masking device 10 may be set, and that it can be applied to a vehicle wheel by merely pressing the spring arms 34 over the tread 16' of the tire 16. This is a matter of practice and experience. However, the adjustable feature enables such size modification as needed for assembly or use of the masking device 10 with vehicle wheels of different sizes.

What we claim as our invention is:

1. An adjustable masking device for a vehicle wheel and tire assembly adapted to be applied to the assembly to cover and thereby protect one side of the tire from paint applied to the corresponding sides of the central body portion and tire-carrying rim of the wheel of said assembly; said adjustable masking device comprising a shield in the form of a thin substantially annular flexible band of one-piece construction having concentric radially inner and outer curved edges, said band being transversely split at one point only of its circumferential extent to render the same contractible, said band having overlapping end portions at the split circumferentially adjustable relative to each other when said band is contracted, the inner curved edge of said band when contracted being thin enough to be inserted between said rim and one side of said tire to position said band in masking position over said one side of the tire, means for holding said overlapping end portions in adjusted position when said inner edge of said band is inserted between said rim and said one side of the tire, and spring means secured to said band, said spring means having portions displaced axially from said band for frictional engagement with the tread of the tire when said inner edge of said band is inserted between said rim and said one side of the tire, to center said masking device with respect to the wheel and tire assembly in proper masking position.

2. An adjustable masking device for a vehicle wheel and tire assembly adapted to be applied to the assembly to cover and thereby protect one side of the tire from paint applied to the corresponding sides of the central body portion and tire-carrying rim of the wheel of said assembly; said adjustable masking device comprising a shield in the form of a thin substantially annular flexible band of one-piece construction having concentric radially inner and outer curved edges, said band being transversely split at one point only of its circumferential extent to render the same contractible, said band having overlapping end portions at the split circumferentially adjustable relative to each other when said band is contracted, the inner curved edge of said band when contracted being thin enough to be inserted between said rim and one side of said tire to position said band in masking position over said one side of the tire, means for holding said overlapping end portions in adjusted position when said inner edge of said band is inserted between said rim and said one side of the tire, and at least three spring arms respectively secured at one end to said band at circumferentially spaced points thereof, said arms having their opposite free ends displaced axially from said band for frictional engagement with the tread of the tire when said inner edge of said band is inserted between said rim and said one side of the tire, to center said masking device with respect to the wheel and tire assembly in proper masking position.

3. The masking device described in claim 2 wherein said spring arms have generally C-shaped intermediate portions, said generally C-shaped portion of each spring arm projecting from the said one end thereof radially outwardly with respect to said band and then curving axially toward the free end of said spring arm.

4. The masking device described in claim 3 wherein said band is concavo-convex in configuration with the concave side facing axially toward the free ends of said spring arms.

References Cited in the file of this patent

UNITED STATES PATENTS

| | | |
|---|---|---|
| 2,363,842 | Duggan | Nov. 28, 1944 |
| 2,627,839 | Hudgins et al. | Feb. 10, 1953 |
| 2,634,704 | Morrison | Apr. 14, 1953 |
| 2,716,391 | Nonemaker et al. | Aug. 30, 1955 |
| 2,726,634 | Horner | Dec. 13, 1955 |
| 2,821,130 | Hummel | Jan. 28, 1958 |
| 2,835,222 | Hall | May 20, 1958 |